United States Patent [19]

Scholl et al.

[11] Patent Number: 4,902,830
[45] Date of Patent: Feb. 20, 1990

[54] POLYARALKYLATED HYDROXYBENZAMIDES, PROCESS FOR THEIR PREPARATION AND THEIR USE

[75] Inventors: Thomas Scholl, Meerbusch; Christian Wegner, Cologne; Christian Frölich, Krefeld; Artur Botta, Krefeld; Heinz-Joachim Rother, Krefeld, all of Fed. Rep. of Germany

[73] Assignee: Bayer Aktiengesellschaft, Leverkusen, Fed. Rep. of Germany

[21] Appl. No.: 200,981

[22] Filed: Jun. 1, 1988

[30] Foreign Application Priority Data

Jun. 6, 1987 [DE] Fed. Rep. of Germany ....... 3719101

[51] Int. Cl.⁴ ................: C07C 91/16; C07C 103/26

[52] U.S. Cl. .................... 564/155; 564/162; 564/167; 564/168; 564/171; 564/174; 252/391; 252/392

[58] Field of Search ............... 564/174, 171, 155, 162, 564/167, 168; 514/166, 617; 252/391, 392

[56] References Cited

U.S. PATENT DOCUMENTS 3,282,939 11/1966 Spivack et al. ..................... 564/174
4,100,082 7/1978 Clason et al. ....................... 564/441
4,231,757 11/1980 Davis ................................. 564/441

*Primary Examiner*—Richard L. Raymond
*Assistant Examiner*—K. Konstas
*Attorney, Agent, or Firm*—Sprung Horn Kramer & Woods

[57] ABSTRACT

New polyaralkylated hydroxybenzamides were found and a process for their preparation; the polyaralkylated hydroxybenzamides are used as corrosion inhibitors.

3 Claims, No Drawings

POLYARALKYLATED HYDROXYBENZAMIDES, PROCESS FOR THEIR PREPARATION AND THEIR USE

The invention relates to new polyaralkylated hydroxybenzamides, processes for their preparation and their use as corrosion inhibitors.

The new polyaralkylated hydroxybenzamides correspond to the formula

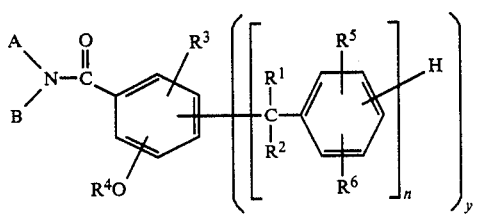

(I)

in which
n represents an integer from 1 to 10 and y represents an integer from 1 to 4, with the proviso that the product n . y has a maximum value of 20, preferably a value of 2 to 10, particularly preferably a value of 3 to 8,
$R^1$ and $R^2$ independently of each other denote hydrogen or $C_1$–$C_4$-alkyl,
$R^3$ represents hydrogen, hydroxyl, O-$C_1$–$C_{18}$-alkyl, $C_1$–$C_{18}$-alkyl, $C_1$–$C_{18}$-alkoxycarbonyl, halogen, a carboxyl, carboxamide, sulpho, sulphonate or amino group,
$R^4$ denotes hydrogen, $C_1$–$C_{18}$-atkyt, $C_8$–$C_{18}$-aralkyl or $C_1$–$C_{18}$-alkylcarbonyl,
$R_5$ and $R_6$ independently of each other represent hydrogen, hydroxyl, halogen or $C_1$–$C_{18}$-alkyl, A and B are identical or different and denote hydrogen, $C_1$–$C_{18}$-alkyl, $C_7$–$C_{18}$-aralkyl, $C_6$–$C_{15}$-aryl, $C_1$–$C_{18}$-alkylcarbonyl or represent a group of the formulae (II)

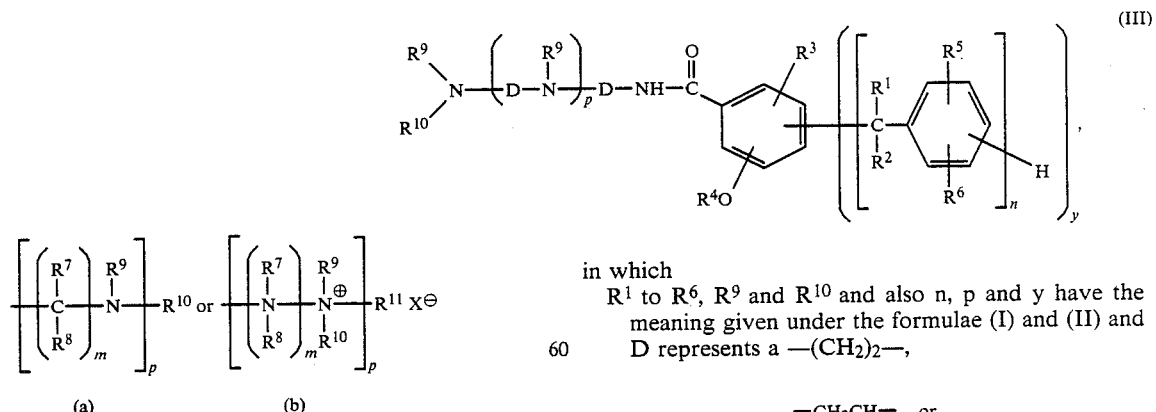

(a)          (b)

in which
$R^7$ to $R^{11}$ independently of each other denote hydrogen, $C_1$–$C_{18}$-alkyl, $C_7$–$C_{18}$-aralkyl or $C_6$–$C_{15}$-aryl,
$X^-$ denotes an anion, preferably a halide, alkylsulphate or arylsulphonate ion, m denotes a number from 2 to 8 and
denotes a number from 1 to 50.

Suitable alkyl radicals in formula (I) are preferably those having 1 to 12 carbon atoms, particularly preferably 1 to 6, especially particularly 1 to 4, carbon atoms. Examples of alkyl radicals which may be mentioned are: methyl, ethyl, propyl, n-butyl, isobutyl, hexyl, ethylhexyl, decyl and stearyl, preferably methyl, ethyl, n-butyl and ethyl-hexyl, particularly preferably methyl, ethyl and n-butyl.

Suitable alkoxy radicals are preferably those having 1 to 12 carbon atoms, particularly preferably 1 to 6 carbon atoms. Examples of alkoxy radicals which may be mentioned are: methoxy, ethoxy, propoxy, butoxy, hexoxy, cyclohexyloxy, dodecyloxy, preferably methoxy, ethoxy, propoxy and butoxy, particularly preferably methoxy, ethoxy and propoxy.

Suitable alkoxycarbonyl radicals are those having 1 to 12 carbon atoms, particularly preferably 1 to 6 carbon atoms. Examples of alkoxycarbonyl radicals which may be mentioned are: methoxycarbonyl, ethoxycarbonyl, propoxycarbonyl, butoxycarbonyl, hexyloxycarbonyl, decyloxycarbonyl and stearyloxycarbonyl, preferably methoxycarbonyl, ethoxycarbonyl, propoxycarbonyl and butoxycarbonyl, particularly preferably methoxycarbonyl, ethoxycarbonyl and propoxycarbonyl.

Suitable aryl radicals are preferably those having 6 to 15, preferably 6 to 10, in particular 6, carbon atoms, for example a naphthyl, methylnaphthyl, diphenyl, tolyl, butylphenyl radical, preferably a phenyl radical.

Suitable aralkyl radicals are those having 7 to 12 carbon atoms, particularly preferably those having 7 to 9 carbon atoms. Examples of aralkyl radicals which may be mentioned are: benzyl, α-methylbenzyl and α,α-dimethylbenzyl, 4-methylbenzyl, tert.-butylbenzyl, methoxybenzyl and 3-chlorobenzyl, preferably benzyl and α-methylbenzyl.

Examples of halogens which may be mentioned are: fluorine, chlorine, bromine, preferably chlorine and bromine, particularly preferably chlorine.

In the abovementioned formula, n preferably represents 1 to 10, m represents 2 to 3, p represents 1 to 14 and y represents 1 to 4.

Preference is given to new polyaralkylated hydroxybenzamides of the formula

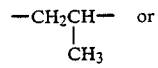

(III)

in which
$R^1$ to $R^6$, $R^9$ and $R^{10}$ and also n, p and y have the meaning given under the formulae (I) and (II) and
D represents a —(CH$_2$)$_2$—, —CH$_2$CH—   or
  |
  CH$_3$ or —(CH$_2$)$_3$— radical.

Particular preference is given to compounds of the formula given below:

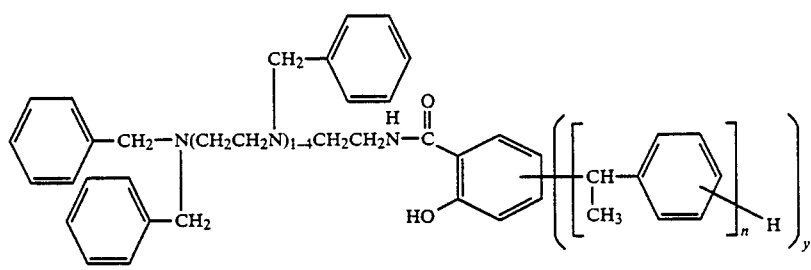
(IV)
n.y = 2 to 6
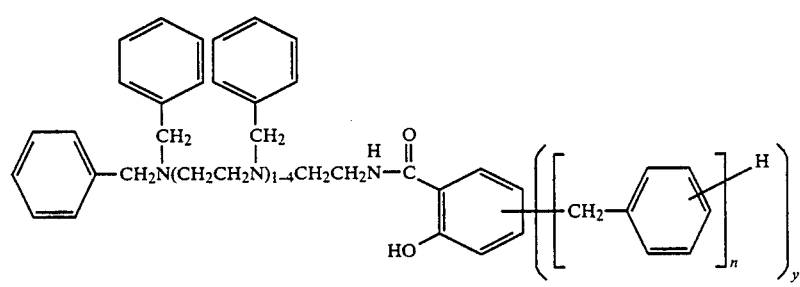
(V)
n.y = 2 to 6
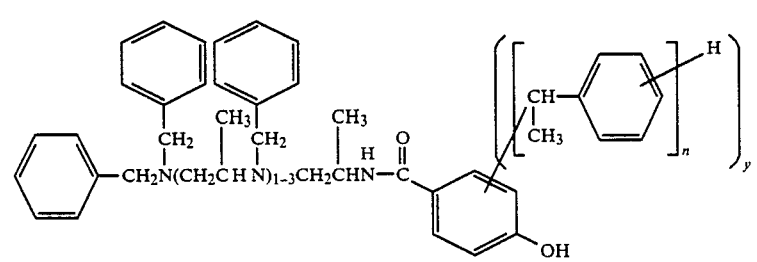
(VI)
n.y = 2 to 6
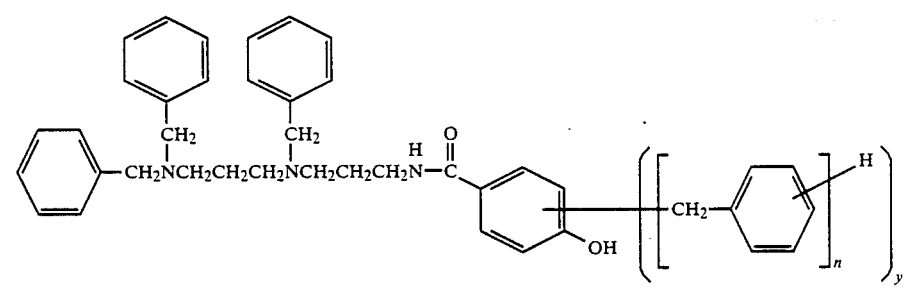
(VII)
n.y = 2 to 6
The invention further relates to a process for the preparation of new polyaralkylated hydroxybenzamides of the formula (I).
The process is characterized in that aromatic hydroxycarboxylic acids or esters thereof of the formula
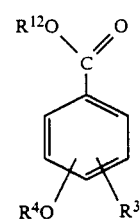
(VIII)
in which
$R^3$ and $R^4$ have the meaning given under the formula (I) and $R^{12}$ denotes hydrogen or $C_1$-$C_4$-alkyl, are reacted with 1 to 20, preferably 2 to 10, mol of α-alkenyl-benzenes of the formula

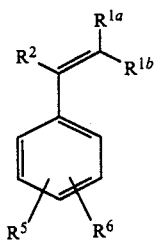 (IX)

in which
$R^{1a}$ and $R^{1b}$ denote hydrogen or $C_1$-$C_3$-alkyl and
$R^2$, $R^5$ and $R^6$ have the meaning given under the formula (I),
or with 1 to 20, preferably 2 to 10, ml of α-haloalkylbenzenes of the formula

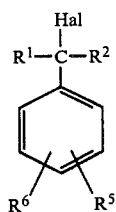 (X)

in which
Hal represents chlorine or bromine and
$R^1$, $R^2$, $R^5$ and $R^6$ have the meaning given under the formula (I),
in the presence of acidic catalysts at 50° to 200° C., and the aralkylated hydroxybenzoic acids or esters thereof obtained are then further reacted with amines of the formula $$HN\begin{smallmatrix}A\\B\end{smallmatrix}$$ (XI)

in which
A and B have the meaning given under the formula (I), at temperatures of 50° to 250° C.

The process according to the invention may be represented by the following formula schemes:

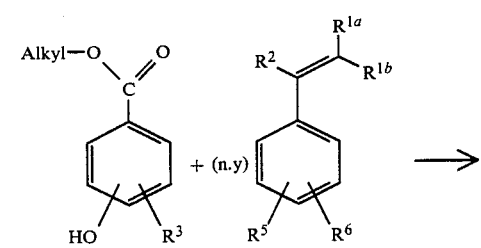 (1a)

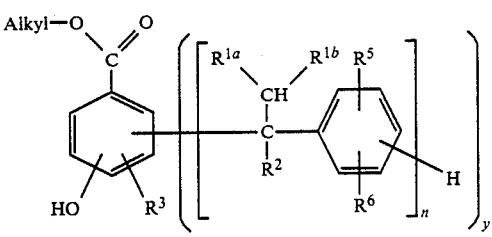

(b)

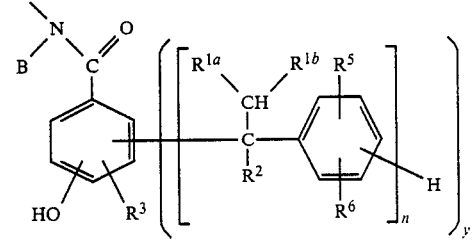

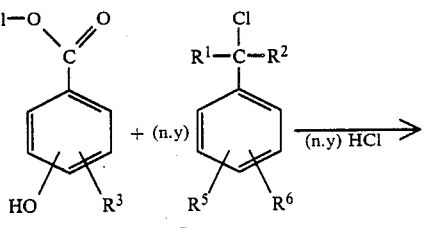 (2a)

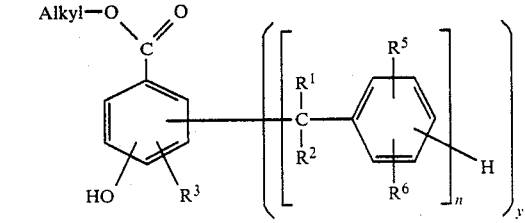

(b)

Suitable acidic catalysts for the process according to the invention are: Bronsted acids such as sulphuric acid, phosphoric acid and/or hydrochloric acid, and also Lewis acids such as aluminium trichloride, zinc chloride, zinc stearate, boron trifluoride and/or tin tetrachloride. Acidic catalysts which are preferably used are: sulphuric acid, phosphoric acid, aluminium trichloride, zinc chloride and/or zinc stearate.

The acidic catalysts are customarily used in amounts of 0.0001 to 0.3, preferably 0.01 to 0.1, mol, relative to 1 mol of aromatic hydroxycarboxylic acid.

According to the invention, 1 to 20, preferably 2 to 10, particularly preferably 3 to 8, mol of α-alkenylbenzenes of the formula (IX) or α-haloalkylbenzenes of the formula (X) are used per mol of hydroxycarboxylic acid or esters thereof.

The reaction temperatures are preferably between 50° and 180° C.

Examples of aromatic hydroxycarboxylic acids or esters thereof which may be mentioned are: salicylic acid, p-hydroxybenzoic acid, methylsalicylic acid, tert.-butylsalicylic acid, 3-nonylsalicylic acid, 5-tert.-octylsalicylic acid, 5-chlorosalicylic acid and 2,4-dihydroxybenzoic acid, and also methyl, ethyl, propyl and butyl esters thereof, preferably p-hydroxybenzoic acid and salicylic acid and also methyl esters thereof.

Examples of α-alkenylbenzenes of the formula (IX) which may be mentioned are: styrene, 4-chlorostyrene, 3- and 4-methylstyrene, 4-hydroxystyrene, α-methylstyrene. Styrene, 4-methylstyrene and α-methylstyrene are preferred.

Examples of α-halobenzenes of the formula (X) which may be mentioned are: benzyl bromide, benzyl chloride, α-chloroethylbenzene, α-chloroisopropylbenzene, α-chlorobutylbenzene, 3- and 4-methylbenzyl chloride, 4-methoxybenzyl chloride and 4-chlorobenzyl chloride, preferably benzyl chloride.

If in the reaction according to the invention for example divinylbenzene or for example xylylene chloride are additionally used, bifunctional representatives such as bis-(hydroxybenzamides) of the formula (I) are obtained.

Examples of amines of the formula (XI) which can be used in the process according to the invention are: aliphatic and aromatic amines having at least one primary or secondary amino group, such as ethylamine, butylamine, cyclohexylamine, benzylamine, stearylamine, diethylamine, dibenzylamine, ethanolamine, diethanolamine, aniline, N-methylaniline, ethylenediamine, 1,2- or 1,3-propylenediamine, di-1,2-propylenetriamine, di-1,3-propylenetriamine, tetramethylenediamine, pentamethylenediamine, hexamethylenediamine, octamethylenediamine; polyethylenepolyamines of the formula $H_2N-CH_2CH_2(NH-CH_2CH_2)_b-NH_2$ in which b denotes an integer from 1 to 50, such as diethylenetriamine, triethylenetetramine and tetraethylenepentamine; polyoxyethylenediamines, polyoxypropylenediamines, 3-(2-aminoethyl)aminopropylamine, 1,2-bis-(3-aminopropylamino)ethane, N,N'-bis-(3-aminopropyl)-1,4-diaminobutane, 4,7,10-trioxatridecane-1,13-diamine; cycloaliphatic and heterocyclic amines, such as 1,2- or 1,3-diaminocyclopentane, 1,2-, 1,3- or 1,4-diaminocyclohexane, 3,3'-, 3,4'- or 4,4'-diaminodicyclohexylmethane, 2,2-bis-(4'-aminocyclohexyl)-propane, 4,4'-diamino-3,3'-dimethyldicyclohexylmethane, 3-aminomethyl-3,5,5-trimethylcyclohexylamine (isophoronediamine), N-2-aminoethyl, N,N'-bis(3-aminopropyl)piperazine, N,N'-bis(2-aminoethyl)-piperazine, 1,3- and 1,4-bis-(aminomethyl)cyclohexane and 3(4),8(9)-bis-(aminomethyl)tricyclo-[5.2.1.0$^{2.6}$]decane, and also derivatives thereof which are partially alkylated on N.

Preference is given to using the following amines of the formula (XI): aminoethanol, ethylenediamine, propylenediamine, diethylene- and dipropylene-triamine, N-methyl- and N-cyclohexyldipropylenetriamine, triethylenetetramine, tetraethylenepentamine, pentaethylenehexaamine, hexaethyleneheptamine, N,N'-bis-(aminopropyl)ethylenediamine, N,N'-bis-(aminoethyl)-propylenediamine, 3-aminomethyl-3,5,5-trimethylcyclohexylamine (isophoronediamine), N-2-aminoethylpiperazine and N,N'-bis-(2-aminoethyl)-piperazine.

In addition to amines ammonia may also be used.

The aralkylated hydroxybenzoic acids or esters can be reacted with the amines in the conventional manner by heating the components to 50° to 250° C., preferably 80° to 180° C., and distilling off the alcohols (cf. Organikum, VEB Deutscher Verlag der Wissenschaften, Berlin 1967, page 394).

The amines of the formula (XI) may be alkylated (quaternized), before or after the reaction according to the invention, with alkyl halides, such as methyl chloride and butyl chloride, aralkyl chlorides, such as benzyl chloride, arylsulphonates, such as methyl toluenesulphonates or alkylsulphates, such as dimethyl sulphate.

The new polyaralkylated hydroxybenzamides are oily to resin-like products having softening points of up to about 130° C. The average molecular weights are about 300 to 5000 (determined by gel permeation chromatography (GPC)).

The invention further relates to the use of these new polyaralkylated hydroxybenzamides as corrosion inhibitors. They can be used for example as anti-corrosives in cleaning, heat transfer and hydraulic fluids, in fuels, metal-working oils and in drilling and flushing fluids for oil drilling rigs. In these fluids, they cause a large reduction in corrosivity against metals. The preferred use of the polyaralkylated hydroxybenzamides according to the invention is the use as anticorrosives in acids, such as are used in petroleum recovery specifically for the acid treatment of drilling holes. It has been found that the polyaralkylated hydroxybenzamides according to the invention reduce the corrosivity of the acids which are used for the drillings against iron and iron alloys considerably more than the reaction products of benzyl chloride and imidazoline derivatives which had been used in acids up to now and which are described in JA-A No. 74/10,579.

It has been found that the polyaralkylated benzamides according to the invention are especially effective anti-corrosives for iron and iron alloys, such as steel, but also for copper, copper alloys such as brass, and also for zinc, lead and aluminium. They are preferably used as anti-corrosives for iron and iron alloys.

The polyaralkylated hydroxybenzamides which are to be used as corrosion inhibitors according to the invention may be used alone or in combination with other known corrosion inhibitors, for example with quaternary ammonium salts and/or imidazolines; combinations with acetylene alcohols, such as propargyl alcohol, hexinol, 2-ethylhexinol, 1-butin-3-ol and/or 2-methyl-3-butin-2ol, have proved to be particularly useful because the corrosion-inhibiting effects of the individual components are reinforced synergistically in these combinations.

The amount in which the corrosion inhibitors according to the invention or a combination thereof with other corrosion inhibitors are used depends upon the nature of the medium which causes the corrosion, and upon the conditions which are present at the site of application and upon the acceptable corrosion rates. As a rule, the polyaralkylated hydroxybenzamides of the formula (I) are used in the fluids whose corrosivity is intended to be reduced in an amount of about 100 to 20,000 ppm, preferably 500 to 4,000 ppm. In order to reduce the corrosivity of weak acids, such as carbon dioxide or hydrogen sulphide, amounts of about 5 to 200 ppm are sufficient.

The polyaralkylated hydroxybenzamides according to the invention of the formula (I) are preferably used in formulated form, i.e. in combination with customary formulating auxiliaries. Beside the corrosion inhibitors according to the invention, such formulations also contain, if desired, other inhibitors and surfactants and solvents. Suitable surfactants are ethoxylated derivatives of aliphatic or araliphatic alcohols or amines having at least 8 carbon atoms, such as 2-ethylhexanol, lauryl alcohol, cetyl alcohol, dodecylamine, tallow fat amine and/or nonylphenol. Suitable solvents are those which are miscible with water and acids, such as lower alcohols, mono- and oligoethylene glycol, lower ketones, formamide, dimethylformamide and/or N-methylpyrrolidone. The following are preferred: isopropanol, formamide, dimethyl-formamide and N-methylpyrrolidone.

PREPARATION EXAMPLES

Example 1

A mixture of 304 g (2 mol) of methyl salicylate and 28 g of concentrated sulphuric acid has added to it at 60° C. 833 g (8 mol) of styrene. After 1 hour, 206 g (2 mol) of diethylenetriamine are added, and 64 g of methanol are distilled off (inside temperature 160° to 180° C.). 1012 g (8 mol) of benzyl chloride are then added at 140° C., and the mixture is stirred for 2 hours at 150° C. and reacted with 1600 g of 20% strength of sodium hydroxide solution by heating at 100° C. for 2 hours. Phase separation and distilling off of the remaining water gives 1950 g of a highly viscous resin.

Elemental analysis: C 80, H 7.6, N 3.9%. N (basic): 2.76%. OH number: 32.

Example 2

If salicylate in Example 1 is replaced by 304 g of methyl p-hydroxybenzoate, approximately 2050 g of a highly viscous resin are obtained.

N (basic): 2.83%. OH number: 32.

Example 3

If 1250 g (12 mol) of styrene are used in Example 1, approximately 2400 g of a viscous resin are obtained.

N (basic): 2.54%. OH number: 22.

Example 4

If Example 2 is repeated, except that the mixture is not reacted with benzyl chloride and sodium hydroxide solution, 1280 g of a viscous resin are obtained.

N (basic): 4.31%. OH number: 64.

Example 5

1012.8 g (8 mol) of benzyl chloride are added dropwise within 2 hours to 304 g (2 mol) of methyl salicylate and 0.5 g of zinc stearate. Vigorous elimination of hydrogen chloride is subsequently completed by introducing dry nitrogen (~2 hours 130° C.) to give 1015 g (99%) of a light brown, viscous oil. $C_{36}H_{32}O_3$ (512.7)

Calculated: C 84.35 H 6.29 N 9.36. Found: 84.54 6.30 9.18.

Example 6

Repeating the procedure of Example 5 and using 506.4 g (4 mol) of benzyl chloride gives 645 g (97%) of a light orange coloured viscous oil. $C_{22}H_{20}O_3$ Calculated: C 79.49% H 6.97% O 14.44%. Found: 79.68 6.17 14.28.

Example 7

Repeating the procedure of Example 5 and using 759.6 g (6 mol) of benzyl chloride gives 830 g (98.2%) of a sticky, viscous resin. $C_{29}H_{26}O_3$ (422.5)

Calculated: C 82.44% H 6.20% O 11.36%. Found: 82.60 6.13 11.20.

Example 8

256.4 g (0.5 mol) of the oil from Example 5 are heated up together with 51.6 g (0.5 mol) of diethylenetriamine, leading to the elimination of methanol >100° C. The mixture is kept at 150° C. for about 1.5 hours and finally in vacuo to give 290 g (99.3%) of a light orange coloured, sticky resin.

$C_{39}H_{41}N_3O_2$ (583.8)

Calculated: C 80.24% H 7.08% N 7.20%. Found: 80.39 6.97 6.99.

Example 9

128.2 g (0.25 mol) of the oil from Example 5 are heated together with 16.8 g (0.275 mol) of 2-aminoethanol at 150° to 170° C. for about 3.5 hours, methanol being distilled off through the top. Evaporation in vacuo of volatile components at 160° C. gives 134.8 g (99.5%) of a yellow-orange resin. $C_{37}H_{35}NO_3$ (541.7)

Calculated: C 82.04% H 6.51% N 2.59%. Found: 82.22 6.69 2.59.

Example 10

128.2 g (0.25 mol) of the oil from Example 5 are heated together with 25.8 g (0.25 mol) of diethylenetriamine at 130° to 150° C. for 2 hours, the resulting methanol being distilled off through the top. While the melt is still warm, it is diluted with 250 ml of toluene, 101.4 g (0.8 mol) of benzyl chloride is poured in at the reflux temperature, the mixture is stirred for 2 hours, 32 g (0.8 mol) of sodium hydroxide dissolved in 100 ml of water are added, and the mixture is stirred at the boiling temperature for another 1.5 hours. The organic layer is separated off, washed with water and concentrated, towards the end in vacuo at 180° C., to give 211.5 g (99% of theory) of a brown, viscous resin.

$C_{60}H_{59}N_3O_2$ (854.2).

Calculated: C 84.37% H 6.96% N 4.92%. Found: 84.55 6.80 4.75.

Example 11

In analogy to Example 10, 83.1 g of the oil from Example 6 are used instead of the oil from Example 5. 167.8 g (99.6%) of an orange-brown, viscous resin are obtained.

$C_{46}H_{47}N_3O_2$ (673.9).

Calculated: C 81.99% H 7.03% N 6.24%. Found: 82.18 7.03 6.05.

Example 12

In analogy to Example 10, using 105.6 g (0.25 mol) of the resin from Example 7 instead of the oil from Example 5 gives 190.3 g (99.6%) of a reddish-brown, viscous resin. $C_{53}H_{53}N_3O_2$ (764.03).

Calculated: C 83.32% H 6.99% N 5.50%. Found 83.58 6.98 5.29.

Example 13

Repeating the procedure of Example 5 and using 304 g (2 mol) of methyl p-hydroxybenzoate instead of the salicylate gives 1012 g (98.7%) of a light brown, viscous resin. $C_{36}H_{32}O_3$ (512.7).

Calculated: C 84.35% H 6.29% 0 9.36%. Found: 84 40 6.30 9.45.

Example 14

If, in analogy to Example 10, instead of the oil from Example 5 the same amount of the resin from Example 13 is used, 203 g (95.1%) of a brown, viscous resin are obtained. $C_{60}H_{59}N_3O_2$ (854.2).

Calculated: C 84.37% H 6.96% N 4.92%. Found: 84.65 6.86 4.74.

Example 15

(Testing of the corrosion-inhibiting effect of the new polyaralkylated hydroxybenzamides in hydrochloric acid)

The tests were carried out as follows:

Formulations which are readily soluble or readily dispersible in aqueous hydrochloric acid were prepared from the corrosion inhibitors to be tested (the polyaralkylated hydroxybenzamides according to the invention or mixtures thereof with acetylene alcohols) by first mixing them with 10% by weight of surfactant (a lauryl sulphate which had been reacted with 30 mol of ethylene oxide) and then diluting the resulting mixtures with dimethylformamide to solutions containing 40% by weight of corrosion inhibitor.

These solutions (formulations) were added to the aqueous hydrochloric acid solutions in which the corrosion-inhibiting effect was to be tested. A degreased steel coupon was placed in aqueous hydrochloric acid to which corrosion inhibitor had been added. After the aqueous hydrochloric acid had acted for 6 hours upon this coupon, the weight loss of the coupon was determined and converted into a surface ablation rate. The corrosion tests were carried out >90° C. in an autoclave which was under an additional pressure of 20 bar of nitrogen.

The steel coupons were manufactured from the steel grades K 50 and N 80, i.e. from low-carbon steels (mild steels), as are used for pipings in oilfields.

The corrosion inhibitors used, the amounts [ppm] in which they were used, the temperatures at which the corrosion tests were carried out, the strength of the aqueous hydrochloric acid which was used for the corrosion tests, the steel grade from which the test coupons were manufactured, and the surface ablation rate (as a measure of the corrosion-inhibiting effect) are listed in the following table.

| Compound from (ppm) | Acetylene alcohol (ppm) | Temp. (°C.) | Acid strength (%) | Steel grade | Surface abrasion rate (μm/h) |
|---|---|---|---|---|---|
| Example 1 (400) | — | 90 | 15 | K 50 | 0.12 |
| Example 1 (1000) | — | 90 | 15 | K 50 | 0.08 |
| Example 1 (1170) | — | 70 | 15 | K 50 | 0.058 |
| Example 1 (100) | Propargyl alcohol (20) | 90 | 15 | K 50 | 0.09 |
| Example 1 (200) | Propargyl alcohol (40) | 90 | 15 | K 50 | 0.07 |
| Example 1 (1000) | Propargyl alcohol (200) | 90 | 15 | K 50 | 0.04 |
| Example 1 (400) | Ethyloctinol (80) | 90 | 15 | K 50 | 0.052 |
| Example 1 (490) | Ethyloctinol (50) | 90 | 15 | K 50 | 0.060 |
| Example 1 (580) | Ethyloctinol (20) | 90 | 15 | K 50 | 0.078 |
| Example 1 (670) | Propargyl alcohol (500) | 70 | 15 | K 50 | 0.045 |
| Example 1 (670) | Propargyl alcohol (500) | 70 | 30 | K 50 | 0.06 |
| Example 1 (670) | Propargyl alcohol (500) | 70 | 15 | N 80 | 0.056 |
| Example 1 (670) | Propargyl alcohol (500) | 70 | 30 | N 80 | 0.142 |
| Example 1 (670) | Propargyl alcohol (500) | 90 | 30 | K 50 | 0.069 |
| Example 1 (670) | Propargyl alcohol (500) | 120 | 15 | N 80 | 4.2 |
| Example 2 (670) | Propargyl alcohol (500) | 70 | 15 | K 50 | 0.043 |
| Example 2 (670) | Propargyl alcohol (500) | 70 | 30 | K 50 | 0.079 |
| Example 3 (670) | Propargyl alcohol (500) | 70 | 15 | K 50 | 0.04 |
| Example 3 (670) | Propargyl alcohol (500) | 70 | 30 | K 50 | 0.11 |
| Example 4 (670) | Propargyl alcohol (500) | 70 | 15 | K 50 | 0.12 |
| Example 4 (670) | Propargyl alcohol (500) | 70 | 30 | K 50 | 2.24 |

-continued

| Compound from (ppm) | Acetylene alcohol (ppm) | Temp. (°C.) | Acid strength (%) | Steel grade | Surface abrasion rate (μm/h) |
|---|---|---|---|---|---|
| Example 8 (670) | Propargyl alcohol (500) | 70 | 15 | K 50 | 0.045 |
| Example 10 (670) | Propargyl alcohol (500) | 70 | 15 | K 50 | 0.047 |
| Example 10 (670) | Propargyl alcohol (500) | 70 | 30 | K 50 | 0.282 |
| Example 11 (670) | Propargyl alcohol (500) | 70 | 15 | K 50 | 0.042 |
| Example 11 (670) | Propargyl alcohol (500) | 70 | 30 | K 50 | 0.070 |
| Example 12 (670) | Propargyl alcohol (500) | 70 | 15 | K 50 | 0.042 |
| Example 12 (670) | Propargyl alcohol (500) | 70 | 30 | K 50 | 0.072 |
| Example 14 (670) | Propargyl alcohol (500) | 70 | 15 | K 50 | 0.041 |
| Example 14 (670) | Propargyl alcohol (500) | 70 | 30 | K 50 | 0.227 |

Test of the corrosion-inhibiting effect of new polyaralkylated hydroxybenzamides against $CO_2$ and $H_2S$ Example 16

The test is carried out according to the so-called wheel test. A 1:1 mixture of petroleum and artificial seawater is gassed for 30 minutes in the absence of oxygen with $CO_2$ or a 1:1 mixture of $CO_2$ and $H_2S$. The corrosion inhibitor and the degreased steel coupon are placed in the mixture, and the test vessel is carefully sealed and rotated on a wheel for 7 days at 80° C. The coupons are then cleaned, and their weight loss is determined. By comparison with the result from a blank test, the protective factor is determined. The following figures were obtained:

| Compound Concentration (ppm) | Corrosive agent | Protective factor (%) |
|---|---|---|
| Example 4 (20) | $CO_2$ | 67 |
| Example 4 (50) | $CO_2/H_2S$ | 48 |
| Example 9 (10) | $CO_2$ | 50 |

The examples show that the compounds according to the invention are effective inhibitors against both strong mineral acids and weakly acidic media.

Particularly noteworthy is the very good protective action in 30% strength hydrochloric acid.

What is claimed is:

1. A polyaralkylated hydroxybenzamide of the formula

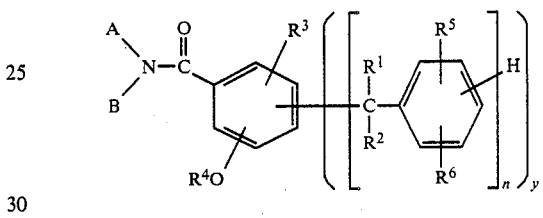

in which n is an integer from 1 to 10 and y is an integer from 1 to 4, with the proviso that the product n·y has a maximum value of 20, $R^1$ and $R^2$ independently of each other are hydrogen or $C_1$–$C_4$-alkyl, $R^3$ is hydrogen, hydroxyl, O-$C_1$–$C_{18}$-alkyl, $C_1$–$C_{18}$-alkyl, $C_1$–$C_{18}$-alkoxycarbonyl, haloen, carboxyl, carboxamide, sulpho, sulphonate or amino, $R^4$ is hydrogen, $C_1$–$C_{18}$-alkyl, $C_8$–$C_{18}$aralkyl or $C_1$–$C_{18}$-alkylcarbonyl, $R^5$ and $R^6$ independently of each other are hydrogen, hydroxyl, halogen or $C_1$–$C_{18}$-alkyl, A and B are identical or different and denote hydrogen, $C_1$–$C_{18}$-alkyl, $C_7$–$C_{18}$-aralkyl, $C_6$–$C_{15}$aryl, $C_1$–$C_{18}$-alkylcarbonyl or are a group of the formula

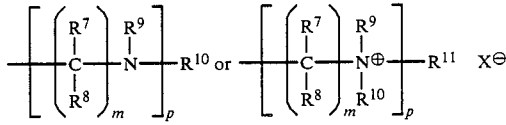

in which $R^7$ to $R^{11}$ independently of each other denote hydrogen, $C_1$–$C_{18}$-alkyl, $C_7$–$C_{18}$-aralkyl or $C_6$–$C_{15}$-aryl, $X^-$ is anion, m is a number from 2 to 8 and p is a number from 1 to 50.

2. The polyaralkylated hydroxybenzamide of Claim 1 in the formula of which the product n·y has a value of 2 to 10.

3. The polyaralkylated hydroxybenzamide of claim 1, wherein $R^1$, $R^2$, $R^5$ and $R^6$ independently of each other are hydrogen or methyl, $R^3$ is hydrogen or $C_1$–$C_{12}$-alkyl and $R^4$ is hydrogen.

* * * * *

UNITED STATES PATENT AND TRADEMARK OFFICE
CERTIFICATE OF CORRECTION

PATENT NO. : 4,902,830

DATED : February 20, 1990

INVENTOR(S) : Scholl et al.

It is certified that error appears in the above-identified patent and that said Letters Patent is hereby corrected as shown below:

Title Page      [75] Third Inventor delete " Christian Frolich, " and substitute -- Christian Frohlich --

Signed and Sealed this

Fourth Day of June, 1991

*Attest:*

HARRY F. MANBECK, JR.

*Attesting Officer*      *Commissioner of Patents and Trademarks*